No. 609,340. Patented Aug. 16, 1898.
H. S. GASKILL.
WINDMILL GOVERNOR.
(Application filed Aug. 26, 1897.)
(No Model.)
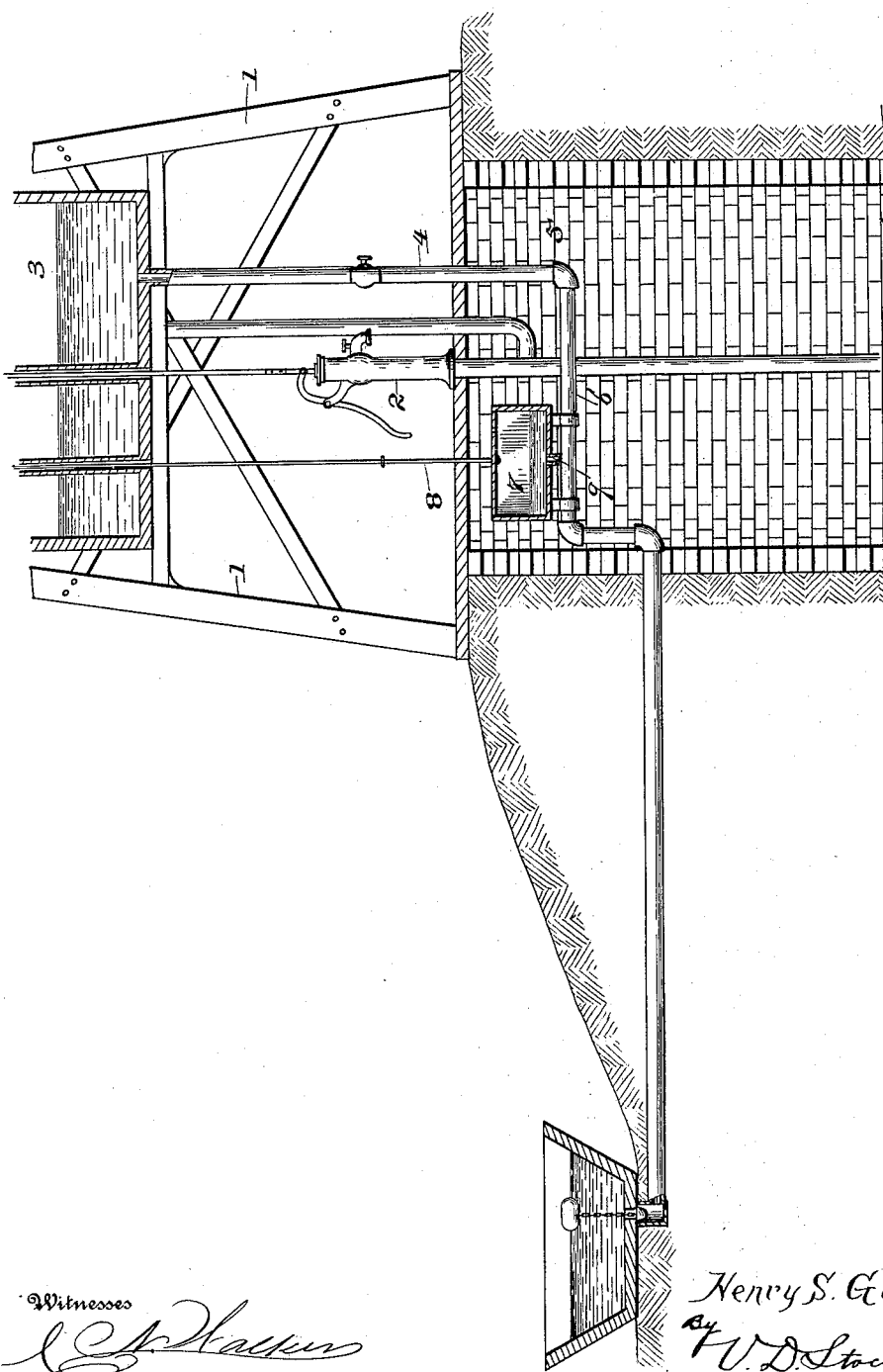
Witnesses
Inventor
Henry S. Gaskill.
By
F. V. D. Stockbridge
Attorney

United States Patent Office.

HENRY S. GASKILL, OF BATTLE CREEK, MICHIGAN.

WINDMILL-GOVERNOR.

SPECIFICATION forming part of Letters Patent No. 609,340, dated August 16, 1898.

Application filed August 26, 1897. Serial No. 649,596. (No model.)

*To all whom it may concern:*

Be it known that I, HENRY S. GASKILL, a citizen of the United States, residing at Battle Creek, in the county of Calhoun and State of Michigan, have invented certain new and useful Improvements in Windmill-Governors; and I do declare the following to be a full, clear, and exact description of the invention, such as will enable others skilled in the art to which it appertains to make and use the same.

This invention relates to a novel construction in a windmill-governor, the object being to provide devices for throwing driving mechanism into and out of gear that is controlled by the height of the water in a tank or reservoir that receives water from the windmill.

The invention consists in the features of construction hereinafter fully described and claimed.

The accompanying drawing, forming a part of this specification, is a perspective view of a windmill having governing means constructed in accordance with this invention.

Referring now to said drawing, 1 indicates the derrick of windmill; 2, the pump; 3, the reservoir that receives water from the pump, and 4 the feed-pipe conveying water from the reservoir to the tank or receptacle—for instance, a barnyard-tank. The pipe 4 passes through a pit 5 below the derrick, which is suitably boxed and protected to prevent freezing or interference with the operative parts of the device, and within said pit the pipe 4 has a horizontal portion 6. Situated within the pit 5 is a tank 7, that is journaled on the horizontal portion of the feed-pipe and connected with the lower end of a cable or chain 8, that extends upwardly and is connected with the mechanism for throwing the windmill into and out of gear. This tank 7 is further connected with the horizontal portion 6 of the pipe by means of the flexible pipe or hose 9 in the manner shown. The tank into which the pipe 4 delivers water is situated below the level of the tank 7, and the entrance of water thereto is controlled by a float-valve in the usual manner. The gearing of the windmill is so arranged that it is normally in operative position, and will therefore lift the cable 8 and tank 7. When the level of the water in the barnyard-tank rises and the float-valve closes the pipe 4, the water passes through the flexible pipe 9 into the tank 7. As this tank fills, its weight causes it to descend and pull down the cable 8 to throw the mill out of gear, it being noted that there is a small escape-cock 10 in the top of the tank 7 to allow the air to escape which enters from the upper end. When the level of the water in the float-valve tank descends, the valve opens the pipe 4, and therefore the water within the tank 7 passes into the pipe 4, and as soon as the tank 7 is lightened sufficiently the windmill turns into gear automatically owing to the fact that it is relieved of the weight of the tank 7.

Having thus described the invention, what is claimed as new, and desired to be secured by Letters Patent, is—

The combination with the two stationary tanks in different horizontal planes, a feed-pipe communicating with said tanks and having a horizontal extension, and a float-valve controlling the lower tank, of a third movable tank located in a horizontal plane intermediate the other tanks and journaled on the horizontal extension of the feed-pipe, a connection attached to the free end of the movable tank and also connected to the gearing of a windmill, and a flexible tubular connection between the movable tank and feed-pipe.

In testimony whereof I have signed this specification in the presence of two subscribing witnesses.

HENRY S. GASKILL.

Witnesses:
 C. W. SEVERANCE,
 W. H. BLISS.